United States Patent
Lerner et al.

(10) Patent No.: US 7,963,658 B2
(45) Date of Patent: Jun. 21, 2011

(54) LIGHT MODULATOR ASSEMBLY

(75) Inventors: Scott Lerner, Corvallis, OR (US); James W. Ring, Blodgett, OR (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1072 days.

(21) Appl. No.: 11/149,605

(22) Filed: Jun. 9, 2005

(65) Prior Publication Data
US 2006/0279704 A1    Dec. 14, 2006

(51) Int. Cl.
*G03B 21/14* (2006.01)
(52) U.S. Cl. .................... 353/31; 349/5; 353/37
(58) Field of Classification Search .............. 353/31, 353/34, 37, 33, 94; 349/5, 7, 8; 359/634
See application file for complete search history.

(56) References Cited

U.S. PATENT DOCUMENTS

| | | | |
|---|---|---|---|
| 5,241,407 A | | 8/1993 | Sonehara et al. |
| 5,298,986 A | | 3/1994 | Owada et al. |
| 5,420,655 A | * | 5/1995 | Shimizu .................. 353/33 |
| 5,424,868 A | | 6/1995 | Fielding et al. |
| 5,648,860 A | * | 7/1997 | Ooi et al. .................. 349/10 |
| 5,973,759 A | * | 10/1999 | Itoh et al. .................. 349/5 |
| 6,179,423 B1 | * | 1/2001 | Kato et al. .................. 353/31 |
| 6,183,091 B1 | * | 2/2001 | Johnson et al. .................. 353/20 |
| 6,373,603 B1 | | 4/2002 | Popovich et al. |
| 6,454,416 B2 | * | 9/2002 | Aoto et al. .................. 353/31 |
| 6,779,892 B2 | | 8/2004 | Agostinelli et al. |
| 6,932,478 B1 | * | 8/2005 | Lin et al. .................. 353/31 |
| 7,172,287 B2 | * | 2/2007 | Kang .................. 353/20 |
| 2001/0046037 A1 | | 11/2001 | Ota et al. |
| 2002/0003609 A1 | | 1/2002 | Lu |
| 2002/0176058 A1 | | 11/2002 | Yasui et al. |
| 2003/0081150 A1 | | 5/2003 | Li et al. |
| 2003/0147112 A1 | | 8/2003 | Mukawa |
| 2004/0012844 A1 | | 1/2004 | Ohtsuki et al. |
| 2004/0233547 A1 | | 11/2004 | Sugano |

FOREIGN PATENT DOCUMENTS
EP    0 615 388 A    9/1994

* cited by examiner

*Primary Examiner* — William C Dowling

(57) ABSTRACT

A light modulator assembly includes first, second, and third light modulators, with first and second dichroic mirrors. The first dichroic mirror is located at an optical pupil of said assembly and is configured to split a beam of light into a first component beam and an intermediate beam. The first dichroic mirror then transmits the first component beam to the first light modulator and reflects the intermediate beam to the second dichroic mirror. The second dichroic mirror is configured to split the intermediate beam into second and third component beams and to direct the second component beam to the second modulator and the third component beam to the third modulator. A third dichroic mirror is configured to receive the output of the first, second, and third modulators and to pass the output from the first, second, and third modulators to display optics.

13 Claims, 3 Drawing Sheets

LIGHT MODULATOR ASSEMBLY

BACKGROUND

Display systems project an image or series of images on to a display surface. In particular, each image is frequently made up of several sub-images. For example, some systems produce a red, a green, and a blue sub-image that are then combined to form a single, full-color image.

Several display systems include a light source module that produces light. The light produced by the light source module is directed to a prism. The prism splits the light into component colors. For example, a tri-color prism may split the color into red, green, and blue light rays. The light directed to each of the modulators is then modulated to form the sub-images, as introduced.

The prisms used to form the device are frequently expensive. Further, the prisms frequently occupy a relatively large space, thereby increasing the overall size of the display system.

SUMMARY

A light modulator assembly includes first, second, and third light modulators, with first and second dichroic mirrors. The first dichroic mirror is located at an optical pupil of the assembly and is configured to split a beam of light into a first component beam and an intermediate beam. The first dichroic mirror then transmits the first component beam to the first light modulator and reflects the intermediate beam to the second dichroic mirror. The second dichroic mirror is configured to split the intermediate beam into second and third component beams and to direct the second component beam to the second modulator and the third component beam to the third modulator. A third dichroic mirror is configured to receive the output of the first, second, and third modulators and to pass the output from the first, second, and third modulators to display optics.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A light modulator assembly is provided herein for use in a display system, such as a rear-projection television or other type of display system. One exemplary light modulator display described below includes multiple individual light modulators. According to such an exemplary embodiment, the light modulator assembly receives multi-component light from a light source module. This light is split into component beams and directed to each modulator using dichroic mirrors and coupling lens assemblies.

The component beams are then modulated by each of the modulators to form individual sub-images. The images are then recombined to form full-color images that are focused onto a display surface by display optics. The use of dichroic mirrors for splitting and directing the light to each modulator may decrease the complexity and expense of the light modulator assembly as well as decrease the overall size of such assemblies. An exemplary display system will first be discussed, followed by an exemplary method of modulating light and an exemplary light modulator assembly.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
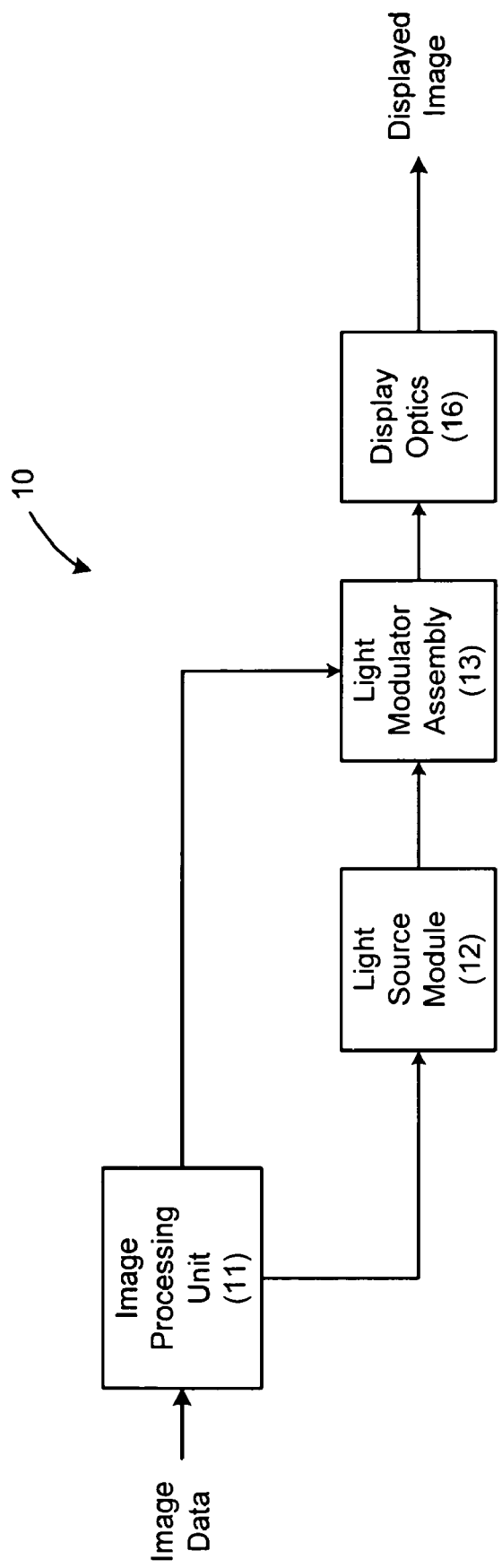
FIG. 1 illustrates a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10).

While one image is illustrated and described as being processed by the image processing unit (11), it will be understood by one skilled in the art that a plurality or series of images may be processed by the image processing unit (11). The image processing unit (11) performs various functions which may include controlling the illumination of a light source module (12) and controlling a light modulator assembly (13).

The light source module (12) produces multi-component light, such as white light, and directs it to the light modulator assembly (13). For ease of reference, white light and multi-component light will be used interchangeably. The incident light may be modulated in its phase, intensity, polarization, or direction by the light modulator assembly (13). The light modulator assembly (13) includes a plurality of individual light modulator panels.

According to such an embodiment, the light modulator assembly includes a plurality of dichroic mirrors that split the multi-component light directed to the light modulator assembly (13) from the light source module (12) into component beams, then direct component beams, such as a red beam, a blue beam, and a green beam, to corresponding light modulators.

Each light modulator then modulates the light incident thereon to form a sub-image. For example, the red modulator modulates the red light to form the red portion of a full-color image. The light modulator assembly (13), according to one exemplary embodiment discussed below, combines each of the sub-images using coupling lens assemblies and the dichroic mirrors and directs the light to the display optics (16).

The display optics (16) may include any device configured to display or project an image. For example, the display optics (16) may be, but are not limited to, a lens configured to project and focus an image onto a viewing surface. The viewing surface may be, but is not limited to, a screen, a television such as a rear projection-type television, a wall, a liquid crystal display (LCD), or a computer monitor. An exemplary method of modulating light will now be discussed.

Method of Operating a Light Modulator Assembly

Figure 2:
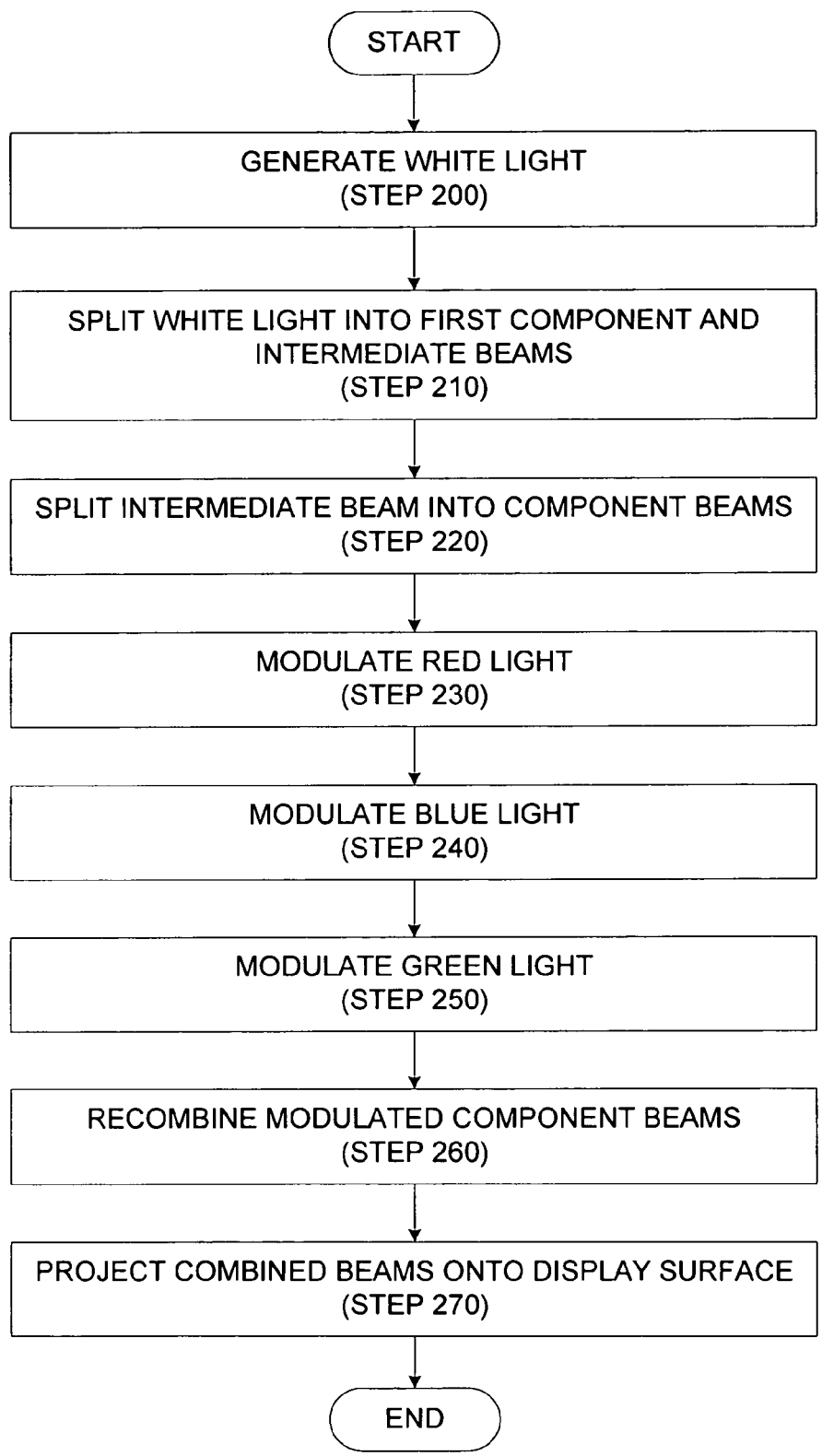
FIG. 2 illustrates a method of operating a light modulator assembly according to one exemplary embodiment.

FIG. 2 illustrates a method of operating a light modulator assembly. The method begins by generating multi-component light (step 200). The multi-component light may be generated by any suitable light source module, such as a xenon gas or mercury arc bulb coupled to a reflector. Light generated by the light source module is then directed to a light modulator assembly.

Light produced by the light source module is then split into a first component beam and an intermediate beam (step 210). For example, the first component beam may include a red beam while the intermediate beam may include a green/blue beam. The multi-component beam may be thus split into the two beams by a dichroic mirror. In particular, a red/green dichroic mirror may be used. Such a mirror transmits red light while reflecting blue and green light. Accordingly, the red portion of the multi-component light is transmitted while the blue and green components of the light beam are reflected, thus splitting the beam into a red component beam and a blue/green intermediate beam. The red component or beam may be directed to a red coupling lens assembly, which directs the red beam to a red modulator, or a light modulator array for modulating red light. While a red component beam is described as being the first component beam, those of skill in the art will appreciate that any color may be selected to be transmitted while the other remaining colors may be reflected as an intermediate beam.

After the first component and intermediate beams have been split, the intermediate beam is then split into its component beams (step 220). For example, according to the present exemplary embodiment, the blue/green intermediate beam is first directed a blue/green dichroic mirror by a blue/green coupling optics assembly. The blue/green dichroic mirror splits the light into a blue beam and a green beam.

Each component beam is then modulated by an associated modulator. For example, according to the present exemplary process, red light is modulated by the red modulator (step 230), the blue light is modulated by the blue modulator (step 240), and the green light is modulated by the green modulator (step 250). These steps occur substantially simultaneously such that the light modulated by each light modulator corresponds to one part of a single image or series of images.

In particular, the light modulators are configured to modulate light in response to data from an image processing unit (11; FIG. 1). The data sent to each light modulator corresponds to the formation of a sub-image. Each modulator may be a reflective- and/or an interference-type light modulator that modulates the light in response to the data to form the sub-images.

After the component beams have been modulated, they are recombined (step 260) and projected onto a display surface (step 270). Accordingly, three component beams are split and directed to individual modulators and recombined using dichroic mirrors One exemplary light modulator assembly will be discussed in more detail below.

Exemplary Light Modulator Assembly

Figure 3:
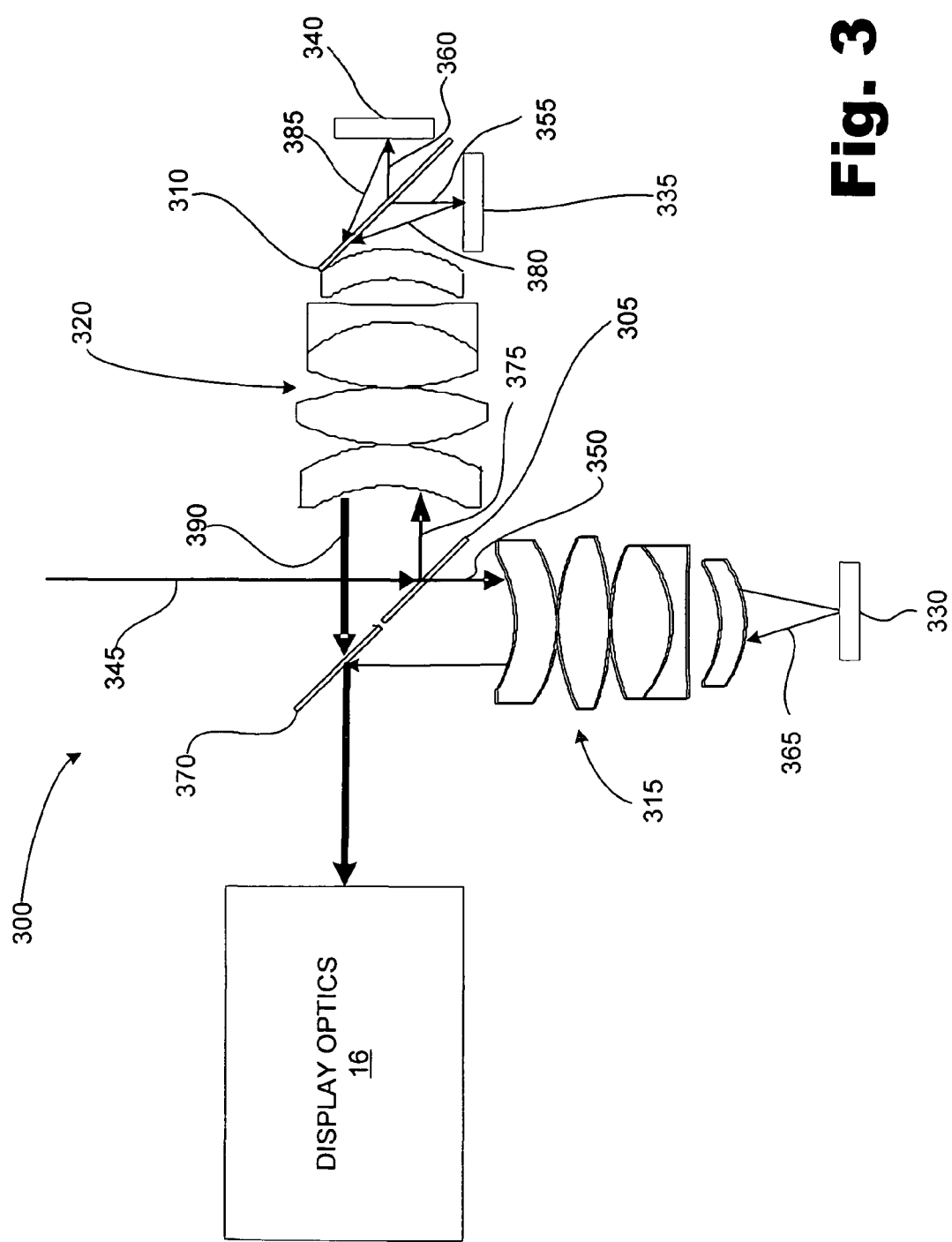
FIG. 3 illustrates a light modulator assembly according to one exemplary embodiment.

FIG. 3 illustrates a light modulator assembly (300) coupled to display optics (16). The light modulator assembly (300) includes a red/green dichroic mirror (305), a blue/green dichroic mirror (310), a red coupling lens assembly (315), a blue/green coupling lens assembly (320), a red modulator (330), blue modulator (335), and green modulator (340). The light modulator assembly (300) is shown coupled to display optics (16).

This configuration provides for the separation of light into separate rays using relatively inexpensive mirrors. Further, the present configuration may provide for relatively simple alignment of individual light modulators. For ease of reference, only light that is transmitted through the light modulator assembly (300) to the display optics (16) will be discussed.

As seen in FIG. 3, a beam of multi-component light (345) is directed to the projection assembly from a light source module (12; FIG. 1). The multi-component light (345) is incident on the red/green dichroic mirror (305). In particular, the red/green dichroic mirror (305) is oriented at an angle of approximately 135 degrees relative to the path of the multi-component light (345), such that an angle of approximately 45 degrees exists between a line normal to the red/green dichroic mirror (305) and the incident multi-component light (345).

The configuration of the red/green dichroic mirror (305), including the coating and orientation thereof, cause the red light (350) to be transmitted by the red/green dichroic mirror (305) and the blue/green light (375) to be reflected, thereby splitting the multi-component light (345) into a first component beam such as a red beam (350) and intermediate beam, such as a blue/green beam (375).

The red beam (350) that is transmitted through the red/green dichroic mirror (305) is incident on the red coupling lens assembly (315). The red coupling lens assembly (315) focuses the right light (350) on a red modulator (330). The red modulator (330) modulates the red beam (350) to form the red portion of the projected image. In particular, according to one exemplary embodiment, the red modulator (330) includes an array of individual pixel elements.

Each pixel element has a portion of the red light (350) focused thereon. Each pixel element may be controlled to modulate light that is incident thereon. By selectively controlling the output of each pixel element, the red modulator (330) generates the red component of an image. This red component of the image, or modulated red light (365), may be directed from the red modulator (330) back through the red coupling lens assembly (315).

As the modulated red light (365) is directed back through the red coupling lens assembly (315), the modulated red light (365) passes through a different portion of the red coupling lens assembly (315) than the red beam (350). Accordingly, the red beam (350) and the modulated red light (365) follow different paths through the red coupling lens assembly (315). Such a configuration may be generally referred to as an off-axis configuration. Such a configuration may allow red light to be modulated and directed to display optics without the use of polarizers. The red coupling lens assembly (315) focuses the modulated red light (365) onto a green/red mirror (370). The green/red dichroic mirror (370) is oriented at an angle of approximately 135 degrees relative to the path of the incident modulated red light (365) such that an angle of approximately 45 exists between the modulated red light (365) and a line normal to the green/red dichroic mirror (370).

The location, orientation, and dichroic coating of the green/red dichroic mirror (370) is such that the modulated red light (365) is reflected. In particular, the green/red dichroic mirror (370) directs the modulated red light (365) to the display optics (16).

As discussed, a first component beam, such as the red beam (350) is split from the green/blue light, directed to a red modulator (330) and directed to the display optics. Accordingly, the path of the red light is separated from the path of the green and blue light. The paths of the blue and green light will now be discussed.

As previously discussed, multi-component light (345) is directed from the light source module (12; FIG. 1) onto the red/green dichroic mirror (305), which is located at the optical pupil of the projection assembly (300). A blue/green beam (375), or the non-red portion of the multi-component light (345), is split from the red light (350). In particular, the blue/green beam (375) is reflected at the same angle at which it was incident, such that an angle of approximately 45 degrees exists between the red/green dichroic mirror (305) and the reflected blue/green beam (375). The reflected blue/green beam (375) is reflected to the blue/green coupling lens assembly (320).

The blue/green coupling assembly lens (320) focuses the blue/green beam (375) on the blue/green dichroic mirror (310). The blue/green dichroic mirror (310) splits the blue/green beam (375) into blue light (355) and green light (360). The blue/green dichroic mirror (310) is oriented at an angle of approximately 45 degrees relative to the incident blue/green light (375). An angle of approximately 45 degrees also exists between the incident blue/green light (375) and a line normal to the blue/green dichroic mirror (310).

The configuration of the blue/green mirror and its orientation splits the blue/green light (375). In particular, the blue light (355) is reflected away from the blue/green dichroic mirror (310) and the green light (360) is transmitted through the blue/green dichroic mirror. The blue light (355) is directed onto the blue modulator (335) while the green light (360) is directed onto the green modulator (340).

The blue and green modulators (335, 340) modulate the blue and green light (355, 360) respectively. Light exiting the blue and green modulators (335, 340), or blue and green modulated light (380, 385), is directed back to the blue/green dichroic mirror (310). The blue and green modulated light (380, 385) corresponds to the blue and green components of the displayed image. This blue and green modulated light (380, 385) is directed to the blue/green coupling lens assembly (320). As the blue and green modulated light (380, 385) is directed back through blue/green coupling lens assembly (320), the blue and green modulated light (380, 385) pass through the blue/green coupling lens assembly (320) in an off-axis configuration, as previously described. Accordingly, the blue and green modulated light (380, 385) and the blue/green light (375) follow different paths through the blue green coupling lens assembly (320).

The blue/green coupling lens assembly (320) combine the blue and green modulated light (380, 385) to form blue/green modulated light (390). The blue/green modulated light (390) is then directed to the green/red dichroic mirror (370). The green/red dichroic mirror (370) transmits the blue/green modulated light (390) to the display optics (16). As previously discussed the green/red dichroic mirror (370) reflects modulated red light (365) to the display optics (16) as well.

Accordingly, the modulated red light (365) is recombined with the blue/green modulated light (390). This recombined light, which corresponds to a full-color image is directed to the display optics (16). The display optics (16) direct the combined light to a display surface to form a single full-color image. As previously discussed, the three-modulator system described herein makes use of relatively inexpensive dichroic mirrors to separate multi-component light and direct the separated light rays toward individual light modulators.

In conclusion, a light modulator assembly has been discussed herein for use in a display system, such as a rear-projection television or other type of display system. One exemplary light modulator display includes multiple individual light modulators. According to such an exemplary embodiment, the light modulator assembly receives substantially multi-component light from a each modulator using dichroic mirrors and coupling lens assemblies.

The component beams are then modulated by each of the modulators to form individual sub-images. The images are then recombined to form full-color images that are focused onto a display surface by display optics. The use of dichroic mirrors for splitting and directing the light to each modulator may decrease the complexity and expense of the light modulator assembly, as well as decreasing the overall size of such assemblies.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A light modulator assembly, comprising:
   first, second, and third light modulators;
   first and second dichroic mirrors, said first dichroic mirror being located at an optical pupil of said assembly and being configured to split a beam of light into a first component beam and an intermediate beam and to transmit said first component beam to said first light modulator and to reflect said intermediate beam to said second dichroic mirror, said second dichroic mirror being configured to split said intermediate beam into second and third component beams and to direct said second component beam to said second modulator and said third component beam to said third modulator; and
   a third dichroic mirror configured to reflect an output of said first light modulator and to pass outputs of said second and third light modulators to display optics
   wherein said assembly is an off-axis modulator assembly such that said beams are offset from an optical axis of said light modulator assembly.

2. The assembly of claim 1, wherein said first component beam includes a red beam of light.

3. The assembly of claim 2, wherein said first dichroic mirror is oriented at an angle of about 135 degrees with respect to a direction of travel of said red beam of light.

4. The assembly of claim 2, wherein said second dichroic mirror transmits blue light and said third dichroic mirror transmits green light.

5. A light modulator assembly, comprising:
   first, second, and third light modulators;
   first and second dichroic mirrors, said first dichroic mirror being located at an optical pupil of said assembly and being configured to split a beam of light into a first component beam and an intermediate beam and to transmit said first component beam to said first light modulator and to reflect said intermediate beam to said second dichroic mirror, said second dichroic mirror being configured to split said intermediate beam into second and third component beams and to direct said second component beam to said second modulator and said third component beam to said third modulator;
   a third dichroic mirror configured to reflect an output of said first light modulator and to pass outputs of said second and third light modulators to display optics; and
   a coupling lens assembly, said coupling lens assembly being placed between said first dichroic mirror and said first light modulator and between said first light modulator and said third dichroic mirror.

6. The assembly of claim 5, wherein said first dichroic mirror is configured to direct said first component beam through a first portion of said coupling lens assembly and said first modulator is configured to direct said output of said first light modulator through a second portion of said coupling lens assembly.

7. The assembly of claim 1, wherein said second component beam is a blue beam of light and said third component beam is a green beam of light.

8. A light modulator assembly, comprising:
   first, second, and third light modulators;
   first and second dichroic mirrors, said first dichroic mirror being located at an optical pupil of said assembly and being configured to split a beam of light into a first component beam and an intermediate beam and to transmit said first component beam to said first light modulator and to reflect said intermediate beam to said second dichroic mirror, said second dichroic mirror being configured to split said intermediate beam into second and third component beams and to direct said second component beam to said second modulator and said third component beam to said third modulator;
   a third dichroic mirror configured to reflect an output of said first light modulator and to pass outputs of said second and third light modulators to display optics; and
   a coupling lens assembly between said first dichroic mirror and said second dichroic mirror and between said second dichroic mirror and said third dichroic mirror.

9. The assembly of claim 8, wherein said first dichroic mirror is configured to direct said first component beam through a first portion of said coupling lens assembly and said first modulator is configured to direct said output of said first light modulator through a second portion of said coupling lens assembly.

10. A display system, comprising:
    a light source module configured to generate multi-component light;
    a light modulator assembly optically coupled to said light source module, said light modulator assembly including first, second, and third light modulators, and first, second and third dichroic minors;
    display optics optically coupled to said light modulator assembly, wherein said first dichroic mirror is located at an optical pupil of said light modulator assembly and is configured to split a beam of light into a first component and an intermediate beam and to transmit said first component beam to said first light modulator and to reflect said intermediate beam to said second dichroic mirror, said second dichroic mirror configured to split said intermediate beam into second and third component beams and to direct said second component beam to said second modulator and said third component beam to said third modulator, and said third dichroic mirror is configured reflect an output of said first modulator to said display optics and transmit an output from said second and said third modulators to said display optics; and
    a first coupling lens assembly between said first dichroic mirror and said first modulator and between said first modulator and said third dichroic mirror, wherein said first component beam passes through a first portion of said first coupling lens assembly and said output of said first light modulator passes through a second portion of said first coupling lens assembly.

11. A display system, comprising:
    a light source module configured to generate multi-component light;
    a light modulator assembly optically coupled to said light source module, said light modulator assembly including first, second, and third light modulators, and first, second and third dichroic minors;
    display optics optically coupled to said light modulator assembly, wherein said first dichroic mirror is located at an optical pupil of said light modulator assembly and is configured to split a beam of light into a first component and an intermediate beam and to transmit said first component beam to said first light modulator and to reflect said intermediate beam to said second dichroic mirror, said second dichroic mirror configured to split said intermediate beam into second and third component beams and to direct said second component beam to said second modulator and said third component beam to said third modulator, and said third dichroic mirror is configured reflect an output of said first modulator to said display optics and transmit an output from said second and said third modulators to said display optics; and
    a second coupling lens assembly between said first dichroic mirror and said second dichroic mirror and between said second dichroic mirror and said third dichroic mirror, wherein said intermediate beam passes through a first portion of said second coupling lens assembly and said outputs of said second and third light modulators pass through a second portion of said second coupling lens assembly.

12. A display system, comprising:
    a light source module configured to generate multi-component light;
    a light modulator assembly optically coupled to said light source module, said light modulator assembly including first, second, and third light modulators, and first, second and third dichroic mirrors; and
    display optics optically coupled to said light modulator assembly, wherein said first dichroic mirror is located at an optical pupil of said light modulator assembly and is configured to split a beam of light into a first component and an intermediate beam and to transmit said first component beam to said first light modulator and to reflect said intermediate beam to said second dichroic mirror, said second dichroic mirror configured to split said intermediate beam into second and third component beams and to direct said second component beam to said second modulator and said third component beam to said third modulator, and said third dichroic mirror is configured reflect an output of said first modulator to said display optics and transmit an output from said second and said third modulators to said display optics;
    wherein said light modulator assembly is an off-axis type light modulator assembly.

13. The assembly of claim 1, wherein said assembly does not include a prism or polarizer.

\* \* \* \* \*

UNITED STATES PATENT AND TRADEMARK OFFICE
CERTIFICATE OF CORRECTION

PATENT NO. : 7,963,658 B2
APPLICATION NO. : 11/149605
DATED : June 21, 2011
INVENTOR(S) : Scott Lerner et al.

It is certified that error appears in the above-identified patent and that said Letters Patent is hereby corrected as shown below:

In column 5, line 64, delete "a each" and insert -- a light source module. This light is split into component beams and directed to each --, therefor.

In column 7, line 35, in Claim 10, delete "minors;" and insert -- mirrors; --, therefor.

In column 7, lines 47-48, in Claim 10, delete "configured reflect" and insert -- configured to reflect --, therefor.

In column 8, line 7, in Claim 11, delete "minors;" and insert -- mirrors; --, therefor.

In column 8, lines 19-20, in Claim 11, delete "configured reflect" and insert -- configured to reflect --, therefor.

In column 8, lines 49-50, in Claim 12, delete "configured reflect" and insert -- configured to reflect --, therefor.

Signed and Sealed this
Thirteenth Day of December, 2011

David J. Kappos
*Director of the United States Patent and Trademark Office*